(12) United States Patent
Hombert et al.

(10) Patent No.: US 12,249,849 B2
(45) Date of Patent: Mar. 11, 2025

(54) WIRELESS POWER TRANSFER SYSTEM AND METHOD OF CONTROLLING A WIRELESS POWER TRANSFER SYSTEM

(71) Applicant: EnerSys Delaware Inc., Reading, PA (US)

(72) Inventors: Antoine Hombert, Croisilles (FR); Patrick Dehem, Vitry en Artois (FR); Paul-Antoine Gori, Arras (FR); Nicolas Métivet, Doullens (FR)

(73) Assignee: EnerSys Delaware Inc., Reading, PA (US)

( * ) Notice: Subject to any disclaimer, the term of this patent is extended or adjusted under 35 U.S.C. 154(b) by 586 days.

(21) Appl. No.: 17/476,812

(22) Filed: Sep. 16, 2021

(65) Prior Publication Data
US 2022/0094209 A1 Mar. 24, 2022

(30) Foreign Application Priority Data
Sep. 18, 2020 (EP) .................................... 20306053

(51) Int. Cl.
*H02J 50/60* (2016.01)
*B60L 53/124* (2019.01)
(Continued)

(52) U.S. Cl.
CPC ............ *H02J 50/60* (2016.02); *B60L 53/124* (2019.02); *H02J 7/0029* (2013.01); *H02J 50/10* (2016.02);
(Continued)

(58) Field of Classification Search
CPC .. H02J 50/10; H02J 7/025; H02J 50/05; H02J 50/12; H02J 7/0029; H02J 50/40–90; B60L 53/124
(Continued)

(56) References Cited

U.S. PATENT DOCUMENTS 4,633,252 A * 12/1986 Bachman ................ G01S 13/60
342/99
6,738,697 B2 * 5/2004 Breed .................... B60C 11/246
701/32.4
(Continued)

FOREIGN PATENT DOCUMENTS

WO 2013001812 A1 1/2013
WO WO-2019206878 A1 * 10/2019 ............ B60L 53/124

OTHER PUBLICATIONS

European Search Report for EP Application No. 20306053.8 mailed Mar. 1, 2021, 6 pages.

*Primary Examiner* — John T Trischler
(74) *Attorney, Agent, or Firm* — Myers Bigel, P.A.

(57) ABSTRACT

A method of controlling a wireless power transfer system. The wireless power transfer system comprises an electromagnetic induction charger operable to emit electromagnetic radiation into an environment of the charger, motion sensor equipment operable to generate an output indicating whether or not a moving object is present in the environment, and a controller. The controller is configured to receive the output from the motion sensor equipment, determine whether the received output indicates that a moving object is present in a predefined region of the environment, and in response to a positive determination, prevent the charger from emitting electromagnetic radiation.

20 Claims, 8 Drawing Sheets

(51) Int. Cl.
  *H02J 7/00*     (2006.01)
  *H02J 50/10*    (2016.01)
  *B60L 53/36*    (2019.01)
  *B60L 53/38*    (2019.01)
  *G01S 13/56*    (2006.01)
  *H02J 50/90*    (2016.01)

(52) U.S. Cl.
  CPC ............. *B60L 53/36* (2019.02); *B60L 53/38* (2019.02); *G01S 13/56* (2013.01); *H02J 50/90* (2016.02)

(58) Field of Classification Search
  USPC .................... 320/108, 109, 155; 307/104
  See application file for complete search history.

(56) References Cited

U.S. PATENT DOCUMENTS

| | | | |
|---|---|---|---|
| 7,672,686 B2* | 3/2010 | Simon | H04W 52/08 455/550.1 |
| 8,264,101 B2* | 9/2012 | Hyde | H02J 50/10 307/80 |
| 8,614,526 B2* | 12/2013 | Cook | H01Q 1/2225 307/104 |
| 9,145,110 B2* | 9/2015 | Van Wiemeersch | B60R 25/1004 |
| 9,265,015 B2* | 2/2016 | Aiuto | G01S 11/06 |
| 9,365,126 B2* | 6/2016 | Widmer | B60L 53/65 |
| 9,472,973 B2* | 10/2016 | Nakagawa | H02J 50/90 |
| 9,493,085 B2* | 11/2016 | Van Wiemeersch | H02J 50/60 |
| 9,531,420 B1* | 12/2016 | Prendergast | H04W 52/34 |
| 9,837,848 B2* | 12/2017 | Fisher-Jeffes | H02J 50/90 |
| 9,906,256 B2* | 2/2018 | Prendergast | H04B 1/3838 |
| 9,941,752 B2* | 4/2018 | Bell | G01S 15/88 |
| 10,128,681 B2* | 11/2018 | Tanaka | B60L 53/65 |
| 10,333,357 B1* | 6/2019 | Abu Qahouq | H02J 50/10 |
| 10,389,179 B2* | 8/2019 | Hannigan | H02J 50/60 |
| 10,447,092 B2* | 10/2019 | Zeine | G01S 11/06 |
| 10,516,446 B2* | 12/2019 | Jeong | H02J 50/10 |
| 10,523,033 B2* | 12/2019 | Leabman | H02J 50/23 |
| 10,627,499 B2* | 4/2020 | Wang | B60L 53/66 |
| 10,675,980 B2* | 6/2020 | Sindia | B60L 53/12 |
| 10,756,580 B2* | 8/2020 | Ardavan | G01R 33/3607 |
| 11,081,907 B2* | 8/2021 | Zeine | H02J 50/80 |
| 11,376,968 B2* | 7/2022 | Park | B60N 2/00 |
| 11,444,489 B2* | 9/2022 | Mitomo | H02J 50/80 |
| 11,527,904 B2* | 12/2022 | Sindia | H02J 7/007188 |
| 11,670,970 B2* | 6/2023 | Leabman | H02J 50/90 307/104 |
| 11,973,353 B2* | 4/2024 | Kim | H02J 50/10 |
| 11,979,033 B2* | 5/2024 | Kausche | H02J 50/60 |
| 12,040,121 B2* | 7/2024 | Brelivet | H01F 30/06 |
| 12,051,937 B2* | 7/2024 | Brelivet | H02J 50/12 |
| 2004/0130442 A1* | 7/2004 | Breed | G06V 20/593 340/449 |
| 2007/0060185 A1* | 3/2007 | Simon | H04W 52/08 455/522 |
| 2009/0102292 A1* | 4/2009 | Cook | H01F 38/14 307/104 |
| 2010/0079005 A1* | 4/2010 | Hyde | H02J 50/30 307/104 |
| 2011/0057606 A1* | 3/2011 | Saunamaki | H02J 50/70 320/108 |
| 2012/0187757 A1* | 7/2012 | Wechlin | B60L 53/124 307/9.1 |
| 2012/0262003 A1* | 10/2012 | Tetu | H02J 50/20 307/104 |
| 2013/0249682 A1* | 9/2013 | Van Wiemeersch | H02J 50/10 320/108 |
| 2013/0278211 A1* | 10/2013 | Cook | H01F 38/14 320/108 |
| 2014/0302783 A1* | 10/2014 | Aiuto | H04W 52/367 455/67.11 |
| 2014/0333256 A1* | 11/2014 | Widmer | B60L 53/30 320/108 |
| 2015/0042271 A1* | 2/2015 | Nakagawa | H02J 50/90 320/108 |
| 2015/0288216 A1* | 10/2015 | Wu | H02J 7/0044 320/108 |
| 2015/0306963 A1* | 10/2015 | Van Wiemeersch | B60L 53/14 320/108 |
| 2015/0380949 A1* | 12/2015 | Hatanaka | H02J 7/00302 307/104 |
| 2016/0028268 A1* | 1/2016 | Fisher-Jeffes | H02J 50/12 320/108 |
| 2016/0033254 A1* | 2/2016 | Zeine | H02J 50/80 307/104 |
| 2016/0254697 A1* | 9/2016 | Tanaka | H02J 7/02 191/2 |
| 2016/0341821 A1* | 11/2016 | Wang | B60L 53/126 |
| 2016/0365886 A1* | 12/2016 | Prendergast | H04W 52/18 |
| 2017/0066334 A1* | 3/2017 | Sindia | B60L 53/12 |
| 2017/0077765 A1* | 3/2017 | Bell | H02J 50/60 |
| 2017/0077977 A1* | 3/2017 | Prendergast | H04B 1/3838 |
| 2017/0085112 A1* | 3/2017 | Leabman | H02J 50/402 |
| 2018/0083669 A1* | 3/2018 | Jeong | H02J 50/10 |
| 2018/0191189 A9* | 7/2018 | Leabman | H02J 50/80 |
| 2018/0269715 A1* | 9/2018 | Hannigan | H02J 50/10 |
| 2019/0118657 A1* | 4/2019 | Wang | B60L 53/39 |
| 2019/0248251 A1* | 8/2019 | Park | B60N 2/00 |
| 2019/0296589 A1* | 9/2019 | Ardavan | H02J 50/10 |
| 2020/0009982 A1* | 1/2020 | Kim | G05D 1/0217 |
| 2020/0044489 A1* | 2/2020 | Zeine | H02J 50/60 |
| 2020/0136435 A1* | 4/2020 | Mitomo | H04B 5/79 |
| 2020/0313464 A1* | 10/2020 | Leabman | H02J 50/402 |
| 2021/0044131 A1* | 2/2021 | Sindia | H02J 7/00712 |
| 2021/0091591 A1* | 3/2021 | Brelivet | H02J 7/04 |
| 2021/0151244 A1* | 5/2021 | Brelivet | H01F 30/06 |
| 2021/0203191 A1* | 7/2021 | Kim | H02J 50/40 |
| 2022/0094210 A1* | 3/2022 | Hombert | H02J 50/005 |
| 2022/0109332 A1* | 4/2022 | Kausche | G01S 13/04 |
| 2022/0376542 A1* | 11/2022 | Xu | H02J 50/12 |
| 2023/0011000 A1* | 1/2023 | Zhou | B60L 53/11 |
| 2024/0262229 A1* | 8/2024 | Iida | B60L 53/66 |

* cited by examiner

WIRELESS POWER TRANSFER SYSTEM AND METHOD OF CONTROLLING A WIRELESS POWER TRANSFER SYSTEM

CROSS-REFERENCE TO RELATED APPLICATION

The present application claims the benefit of priority under 35 U.S.C. § 119 to European Patent Application No. 20306053.8, filed on Sep. 18, 2020, the disclosure of which is incorporated herein by reference in its entirety.

TECHNICAL FIELD

The present disclosure relates to wireless power transfer systems. Particularly, but not exclusively, the present disclosure relates to wireless power transfer systems comprising an electromagnetic induction charger operable to emit electromagnetic radiation into an environment of the charger. The present disclosure also relates to methods of controlling wireless power transfer systems.

BACKGROUND

Wireless power transfer, or WPT, relates to the wireless transmission of electrical energy from a primary (transmitting) side to a secondary (receiving) side. Energy may be transferred via electromagnetic induction from the primary side to the secondary side. The primary side may be situated in a charging station, for example, and the secondary side may be electrically coupled to a chargeable battery. Wireless charging may be used in many applications, such as the charging of electrically powered vehicles. For example, a forklift truck may have an on-board battery pack which may be charged wirelessly when the forklift truck is positioned sufficiently close to a charging station for near-field (or 'inductive') coupling to occur.

In WPT systems, power may be transmitted from a primary coil, e.g., in a charger, by generating a variable electromagnetic field which is received by a secondary coil. Generating such a variable electromagnetic field involves emitting radiation into an environment of the charger. The field strength of the electromagnetic field at a given location is dependent on the distance of that location from the charger. In many applications, for example in the charging of electrically powered vehicles, electromagnetic fields having a relatively high intensity may be required, e.g., to provide a sufficiently high power charge. For example, a 5 kilowatt (kW) charge may be used to charge a 36 volt (V) battery for a forklift truck. This can result in a high field strength in the vicinity of the charger during charging. Such a high field strength and/or high intensity electromagnetic radiation may be potentially hazardous to humans and/or other living creatures that may be exposed to it.

The present disclosure seeks to address the above-mentioned problems. Alternatively or additionally, the present disclosure seeks to provide improved WPT systems.

SUMMARY

According to a first aspect, there is provided a wireless power transfer (WPT) system, comprising: an electromagnetic induction charger operable to emit electromagnetic radiation into an environment of the charger; motion sensor equipment operable to generate an output indicating whether or not a moving object is present in the environment; and a controller configured to: receive the output from the motion sensor equipment; determine whether the received output indicates that a moving object is present in a predefined region of the environment; and in response to a positive determination, prevent the charger from emitting the electromagnetic radiation.

According to a second aspect, there is provided a method of controlling a wireless power transfer (WPT) system, the WPT system comprising an electromagnetic induction charger operable to emit electromagnetic radiation into an environment of the charger, the method comprising: receiving, from motion sensor equipment, an output indicating whether or not a moving object is present in the environment; determining whether the received output indicates that a moving object is present in a predefined region of the environment; and in response to a positive determination, preventing the charger from emitting the electromagnetic radiation.

It should be appreciated that features described in relation to one aspect of the present disclosure may be incorporated into other aspects of the present disclosure. For example, a method aspect may incorporate any of the features described with reference to an apparatus aspect and vice versa.

BRIEF DESCRIPTION OF THE DRAWINGS

Embodiments of the present disclosure will now be described by way of example only with reference to the accompanying schematic drawings of which.

DETAILED DESCRIPTION

Figure 1A:
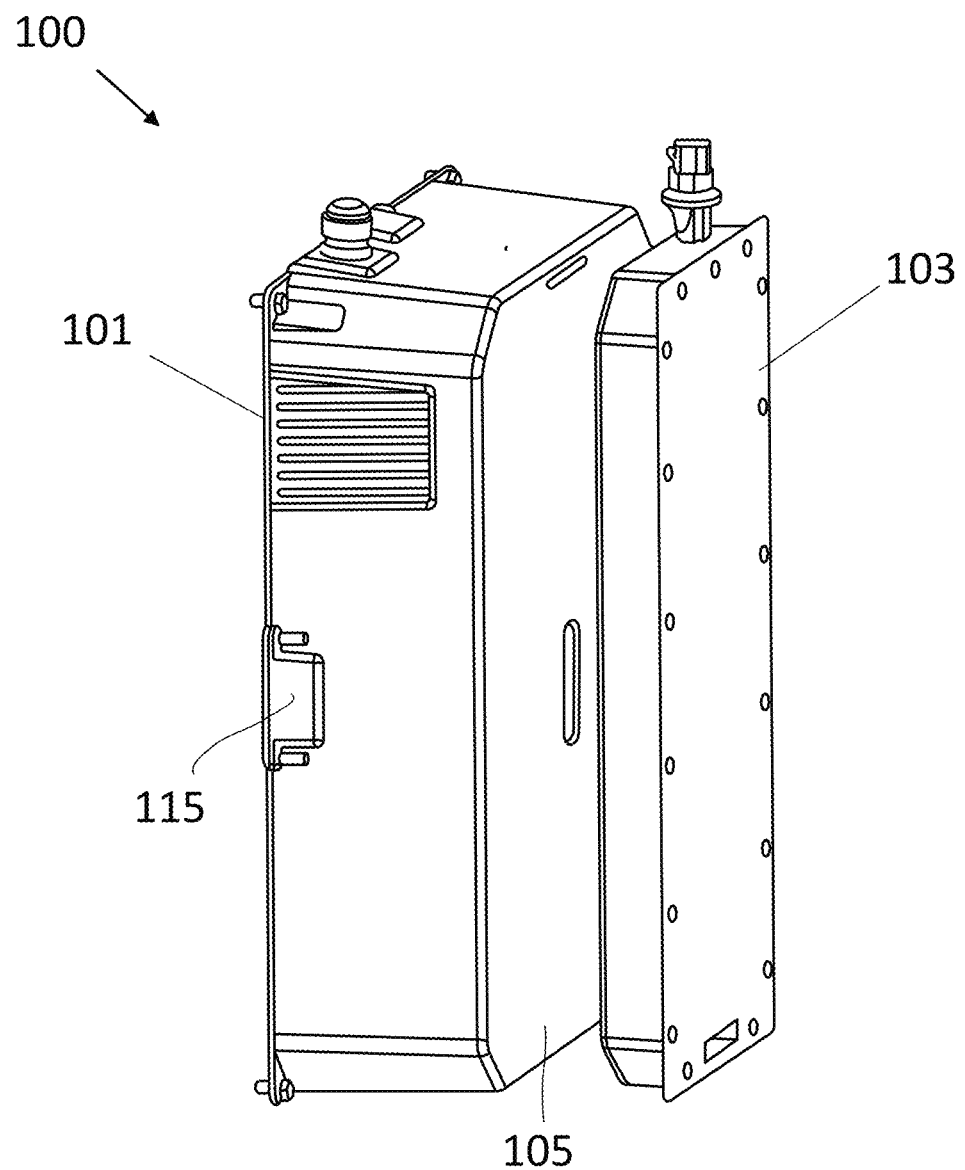
FIGS. 1A to 1C show perspective views of a wireless power transfer system according to embodiments of the present disclosure.
Figure 1B:
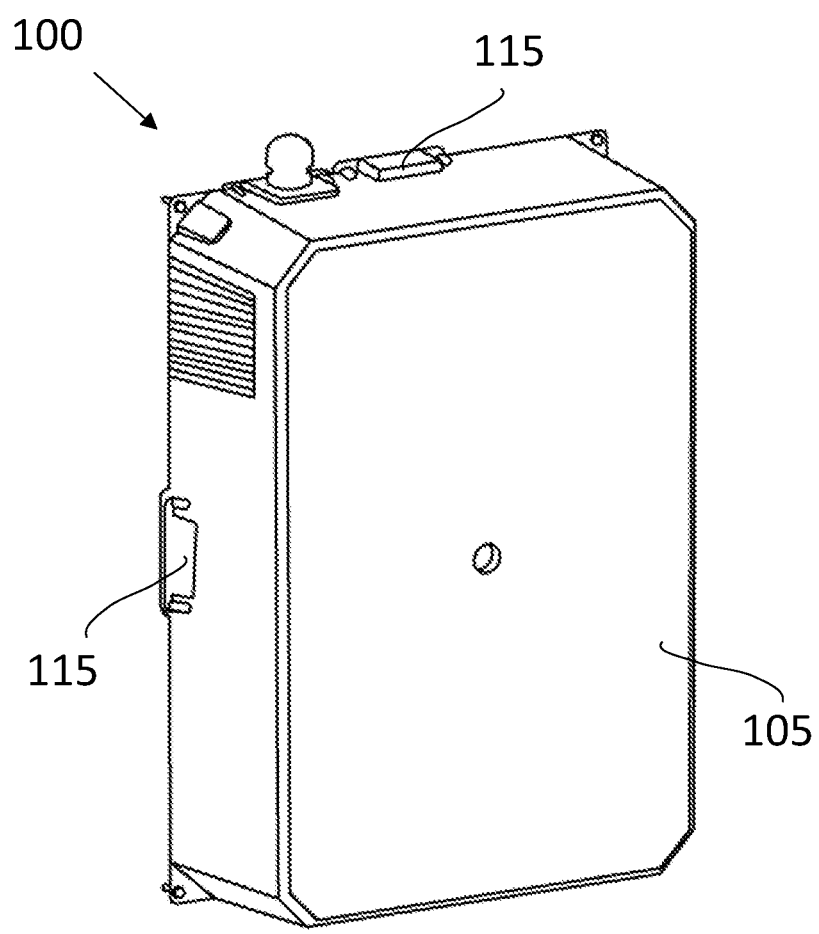
Figure 1C:
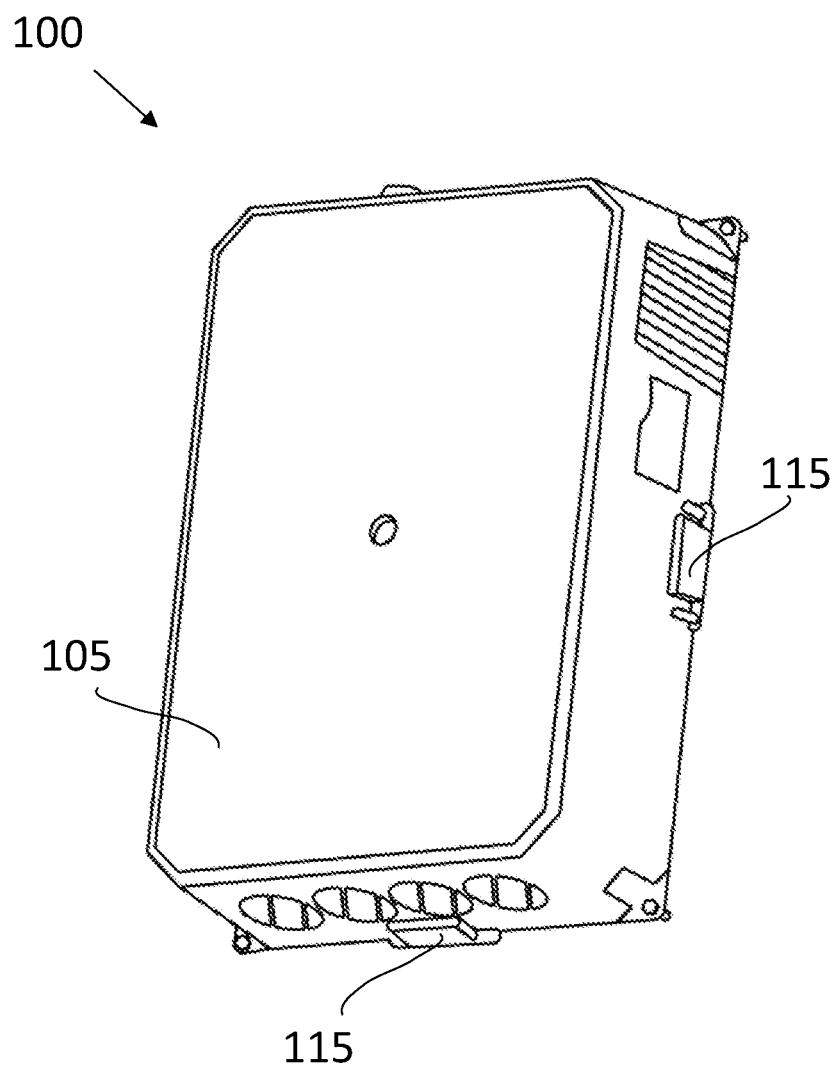

FIG. 1A shows a perspective view of a wireless power transfer, WPT, system 100 according to embodiments of the present disclosure. The WPT system 100 comprises a charger 101 and a device 103 to be charged or powered by the charger 101. The charger 101 comprises the primary side of the WPT system 100, and the device 103 comprises the secondary side of the WPT system 100. Alternative perspective views of the WPT system 100 are shown in FIGS. 1B and 1C.

The charger 101 comprises an electromagnetic induction charger configured to wirelessly charge the device 103 via electromagnetic induction. In embodiments, the charger 101 comprises a charging pad 105. The charging pad 105 comprises a face of the charger 101 against which a corresponding face of the device 103 is positioned in order to enable wireless power transfer from the charger 101 to the device 103. The device 103 may be included in or coupled to a battery pack, for example.

It will be appreciated that, whilst the charger 101 is illustrated in FIG. 1A with a vertically oriented charging pad 105, the orientation of the charger 101 and of the charging pad 105 is unimportant. The charger 101 may equally be arranged to lay flat, such that the charging pad 105 is horizontally oriented. In such embodiments, the device 103 may be positioned on or above the charging pad 105 to enable powering or charging by the charger 101. Thus, in such embodiments, the charging pad 105 may act as a platform for the device 103 during charging. Where, for example, the WPT system 100 is for charging an electric vehicle, the charger 101 may be arranged vertically (as illustrated), such that the electric vehicle is parked adjacent to the charger 101 for charging. Alternatively, the charger 101 may be arranged horizontally, such that the electric vehicle is parked above the charger 101 for charging.

The WPT system 100 comprises motion sensor equipment 115, as will be described in more detail below. The motion sensor equipment 115 is comprised in, or coupled to, the charger 101.

Figure 2:
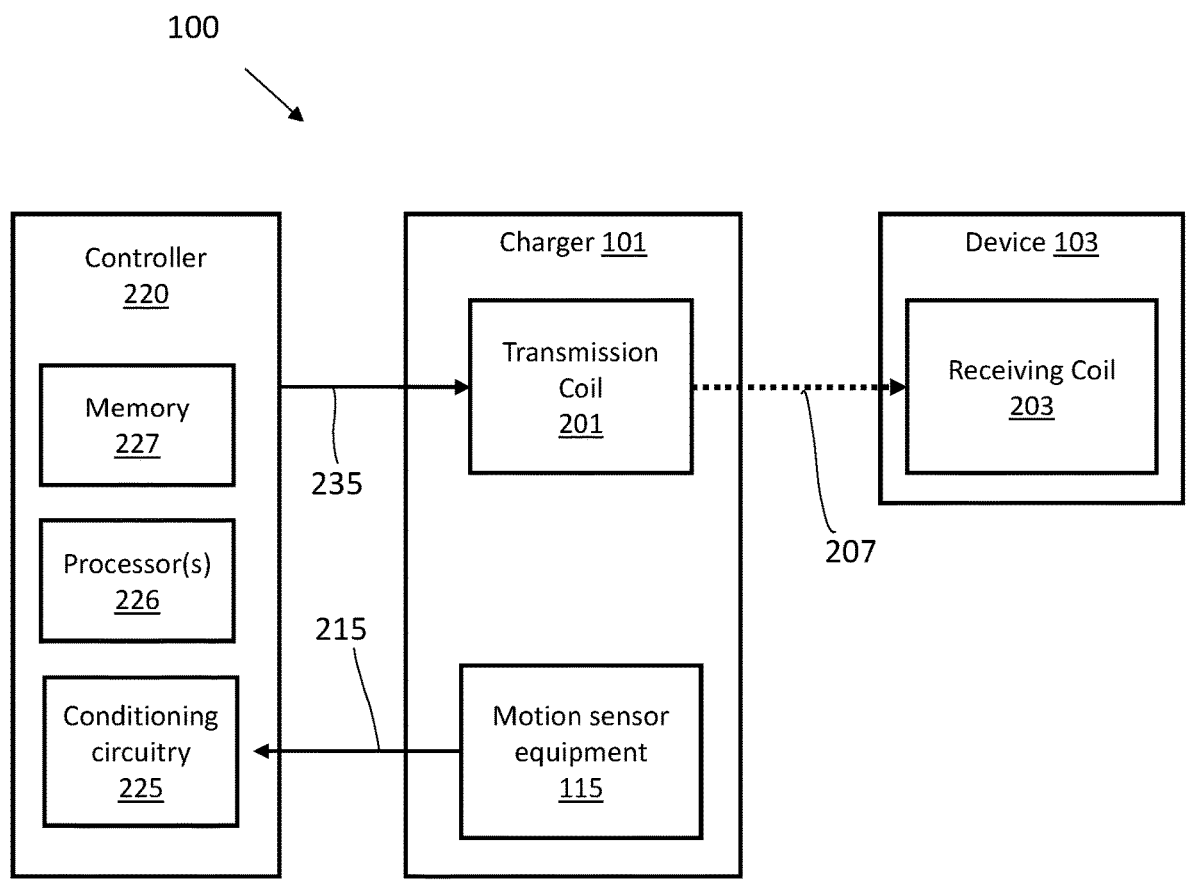
FIG. 2 shows a functional block diagram of a wireless power transfer system according to embodiments of the present disclosure.

A functional block diagram of the WPT system 100 is shown in FIG. 2. The charger 101 comprises a transmission coil 201, also referred to as a primary charging coil. In embodiments, the transmission coil 201 comprises an inductor. Thus, passing an electric current through the transmission coil 201 generates an electromagnetic field. It will be appreciated that the size and power rating of the transmission coil 201 depend on the specific application(s) for which the charger 101 is designed. The transmission coil 201 is positioned behind (for example, immediately behind) the charging pad 105. In embodiments, the transmission coil 201 occupies a plane. The plane of the transmission coil 201 may be parallel to the plane of the charging pad 105. In embodiments, the dimensions and position of the transmission coil 201 can be considered to define the charging pad 105 as a selected portion of a larger surface of the charger 101.

The transmission coil 201 is configured to generate an electromagnetic field for wireless charging, thereby emitting electromagnetic radiation 207 into the environment of the charger 101. The device 103 comprises a receiving coil 203, also referred to as a secondary charging coil. The electromagnetic radiation 207 induces a voltage across the receiving coil 203, which drives an electric current through the receiving coil 203. The electric current induced through the receiving coil 203 can be used to power and/or charge a battery on the device 103. Thus, it can be said that the transmission coil 201 is configured to transmit power and the receiving coil 203 is configured to receive power. Power is therefore wirelessly transferred from the charger 101 to the device 103 via the electromagnetic field. The primary charging coil 201 and the secondary charging coil 203 can each be considered to be a respective half of a transformer, such that bringing the transmission coil 201 and the receiving coil 203 together forms a transformer. It will be appreciated that, due to losses and inefficiencies, not all of the power sunk into the transmission coil 201 is received at the receiving coil 203.

In embodiments, the charger 101 comprises charging control electronics (not shown) configured to cause excitation of the transmission coil 201 to generate the electromagnetic field. The charging control electronics are configured to deliver a transmission coil current to the transmission coil 201. The charging control electronics may comprise a power converter, for example a DC-AC power converter or an AC-AC power converter. In such embodiments, the transmission coil current causes the excitation of the transmission coil 201 and thereby controls the generated electromagnetic field. It will be appreciated that, to provide continual excitement of the transmission coil 201, the delivered transmission coil current comprises an alternating current. In alternative embodiments, the transmission coil current is provided by a separate power supply (for example, external to the charger 101). In such embodiments, the charging control electronics may operate to connect and disconnect the transmission coil 201 from the separate power supply. Thus, in embodiments, the charging control electronics are configured to act as a switch. In such embodiments, the charging control electronics may comprise a relay or other switching circuitry.

As described above, the WPT system 100 also comprises motion sensor equipment 115. In embodiments, the motion sensor equipment 115 is comprised in the charger 101. In alternative embodiments, the motion sensor equipment 115 is separate from the charger 101. In embodiments, the WPT system 100 comprises a housing arranged to house the charger 101, and the motion sensor equipment 115 is housed substantially within the housing. In alternative embodiments, the motion sensor equipment 115 is at least partially external to the housing. The motion sensor equipment 115 is operable to generate a senor output 215 indicating whether or not a moving object is present in the environment of the charger 101.

The WPT system also comprises a controller 220. Although the controller 220 is shown in FIG. 2 as being separate from the charger 101 and the motion sensor equipment 115, in some embodiments the controller 220 is comprised in the charger 101 and/or the motion sensor equipment 115. In some embodiments, the controller 220 and/or the motion sensor equipment 115 is integrated in the charger 101. In some examples, the controller 220 comprises the charging control electronics of the charger 101.

The controller 220 may comprise one or more components. The one or more components may be implemented in hardware and/or software. The one or more components may be co-located or may be located remotely from each other in the system 100. The controller 220 may be embodied as one or more software functions and/or hardware modules. In embodiments, the controller 220 comprises one or more processors 226 configured to process instructions and/or data. Operations performed by the one or more processors 226 may be carried out by hardware and/or software. In embodiments, the controller 220 comprises at least one memory 227. The at least one memory 227 may comprise at least one volatile memory, at least one non-volatile memory, and/or at least one data storage unit. The volatile memory, non-volatile memory and/or data storage unit may be configured to store computer-readable information and/or instructions for use by one or more processors 226.

The controller 220 is configured to receive the sensor output 215 from the motion sensor equipment 115. The controller 220 is further configured to determine whether the received sensor output 215 indicates that a moving object is present in a predefined region of the environment. In response to a positive determination, the controller 220 is configured to prevent the charger 101 from emitting the electromagnetic radiation 207 into the environment. For example, the controller 220 can output a control signal 235 to cause emission of electromagnetic radiation by the charger 101 to be prevented. Such a control signal 235 may be sent to and processed by the charging control electronics of the charger 101, for example.

Therefore, the WPT system 100 is provided with a mechanism for protecting objects (including living objects) from potentially harmful and/or hazardous exposure to electromagnetic radiation. For example, high-intensity electromagnetic fields can be harmful for human health and/or for medical implants carried by humans. Recommendations on human exposure to variable low frequency electromagnetic fields are given by the International Commission on Non-Ionizing Radiation Protection. For example, it may be desired and/or required that humans are not exposed to a 100 kHz electromagnetic field at more than 26 µT. The protection system described herein thus acts to stop the emission of the field if it is determined that someone may be exposed to an excessive electromagnetic field intensity. The WPT system 100 is therefore made more safe.

In embodiments, the motion sensor equipment 115 comprises a radar device. The radar device is configured to emit and receive radio frequency, RF, signals. In embodiments, the radar device comprises a Doppler radar device. A Doppler radar uses the Doppler effect to determine the motion of objects at a distance from the radar. The operating frequency of the radar device (e.g., the frequency of emitted RF signals) may be between 10 gigahertz (GHz) and 30 GHz. In some examples, the operating frequency of the radar device is 24 GHz.

The radar device may be arranged to transmit an RF wave having a fixed frequency. This wave propagates in the environment and is partially reflected when it hits an object. The reflected wave is detected by the radar device, which calculates the difference between the frequency of the transmitted wave and the frequency of the reflected wave. If the object is stationary, the reflected wave has the same frequency as the transmitted wave. If the object is moving, however, the frequency of the reflected wave is different from the frequency of the transmitted wave, or stated differently the difference between the frequencies is non-zero. The sensor output 215 may therefore comprise a constant signal in the absence of movement, and a low-frequency varying signal in the presence of movement. In embodiments, the difference between the frequency of the transmitted signal and the frequency of the reflected signal is indicative of the radial component of the velocity of a moving object relative to the radar.

By using a high frequency radar device as motion sensor equipment, the operating frequencies of the radar and the charger 101 are decoupled, or in other words kept separate. The operating frequency of the charger 101 is typically around 100 kilohertz (kHz), whereas the operating frequency of the radar device (e.g., a Doppler radar device) may be around 24 GHz. This ensures that the radar can operate reliably in the presence of the electromagnetic field generated by the charger 101. The protection system can therefore operate during use of the charger 101. Further, such a separation of operating frequencies allows the operating frequency of the charger 101 to be filtered out from the motion detection process, as will be described in more detail below.

Further, the radar device can operate when covered by a surface. For example, the radar device may be arranged at least partially within the housing of the charger 101. Dust or other particulate matter may accumulate on the outside of the housing, which protects the radar device, and the radar device can still operate by transmitting and receiving signals through the housing. The radar device is thus less sensitive to dust compared to some other means of detecting moving objects.

Moreover, a radar-based motion sensor equipment is less heat-sensitive than some other motion detection systems, such as temperature-based motion detection systems. The charger 101, when it is operating, may cause a rise in temperature in the environment of the charger 101. A radar-based motion detection system is not impaired by such environmental heating. By being less sensitive to heat and/or accumulation of dust, the reliability of the protection system of the present disclosure is increased. This ensures that the protection system can be used reliably in a variety of environments, including industrial environments.

In embodiments, the motion sensor equipment 115 comprises a plurality of motion sensor devices. This is shown, for example, in FIGS. 1B and 1C, in which multiple motion sensor devices are arranged at different locations relative to the charging pad 105. For example, the motion sensor equipment 115 may comprise four motion sensor devices, it being understood that a different number of motion sensor devices may be used in other examples. Each motion sensor device may comprise a radar device. As such, in embodiments, the motion sensor equipment 115 comprises a plurality of radar devices. In such embodiments, different radar devices in the plurality of radar devices are configured to emit RF signals in different directions, and/or to receive RF signals from different directions.

A given radar device is arranged to emit RF signals having a direction of propagation. In embodiments, an angle between the direction of propagation and the plane of the transmission coil 201 has a magnitude of less than 90 degrees. That is, the angle between the direction of propagation and the plane of the transmission coil 201 may be between −90 degrees and +90 degrees. As such, in embodiments, the direction of propagation of the RF signals is not perpendicular to the plane of the transmission coil 201. Similarly, the direction of propagation of the RF signals is not perpendicular to the plane of the charging pad 105, in some embodiments. This allows objects other than the device 103 to be detected. As described above, during charging of the device 103, the device 103 may be arranged adjacent to the charging pad 105, e.g., directly above the charging pad 105 when the charger 101 is in a horizontal orientation. As such, the moving object detection system is arranged to detect the presence of foreign objects (e.g., objects other than the device 103, which are not intended to be in the vicinity of the charger 101 during charging) around the periphery of the charging pad 105, rather than the presence of the device 103 itself. For example, the charging pad 105 may be arranged horizontally, and an electric vehicle parked above the charging pad 105 for charging. In such a scenario, the moving object detection system may be configured to detect humans that are standing next to the electric vehicle.

In embodiments, the controller 220 is configured to determine whether the received sensor output 215 indicates that a moving object is present in the predefined region of the environment by processing the sensor output 215. For example, the sensor output 215 may be a raw signal that is processed and/or conditioned by the controller 220. The motion sensor equipment 115 may detect whether any moving object is present in any region of the environment, and the controller 220 may then determine whether any of the detected objects are in the predefined region of the environment, as opposed to other regions. In alternative embodiments, the sensor output 215 itself indicates whether a moving object is present in the predefined region. That is, the motion sensor equipment 115 may be configured to detect whether a moving object is present in the predefined region. In such embodiments, the controller 220 reads the sensor output 215 to determine whether the received sensor output 215 indicates that a moving object is present in the predefined region. As such, the identifying of the moving object in the predefined region may be performed by the motion sensor equipment 115 or by the controller 220.

In embodiments, the predefined region extends in a given direction from the charger 101 to an outer boundary that is set at a predefined distance from the charger 101. As such, moving objects that are within the vicinity of the charger 101 (e.g., within a predefined distance from the charger 101) may be protected from the electromagnetic radiation emitted by the charger 101.

In embodiments, the controller 220 is configured to modify the predefined distance based on an intensity of the electromagnetic radiation emitted by the charger 101 and/or based on a power output of the charger 101. In embodiments, the predefined distance is between 0.5 meters and 1.5 meters. In some such embodiments, the predefined distance is approximately 1 meters.

In embodiments, the controller 220 determines, based on the sensor output 215, whether a moving object is present in the predefined region and not present in a further region of the environment. In such embodiments, moving objects in the further region do not cause emission of electromagnetic radiation by the charger 101 to be prevented. That is, charging by the charger 101 is permitted when moving objects are in the further region, but is not permitted when moving objects are in the predefined region.

The further region may extend outwards from the outer boundary defining the predefined region, away from the charger 101. As such, moving objects that are beyond the outer boundary (and thus not within the predefined distance of the charger 101), are permitted during charging, as any risk and/or harm to such objects is relatively low compared to objects that are close to the charger 101 during charging. The predefined region may thus be referred to as a "near region", whereas the further region may be referred to as a "far region". The predefined region and/or the further region may be defined differently in alternative embodiments.

In embodiments, the controller 220 is configured to generate an alert in response to determining that a moving object is present in the predefined region of the environment. The alert may comprise an audio and/or visual alert, for example. In such embodiments, a user is made aware that the charging of the device 103 is being prevented by the presence of an object (which may be, for example, the user him/herself) in the predefined region. Based on receiving the alert, the user can move the object (e.g., him/herself) away from the charger 101.

In embodiments, the controller 220 is configured to cause the charger 101 to emit electromagnetic radiation in response to a negative determination, subsequent to the positive determination. That is, if the controller 220 determines that a moving object is no longer present in the predefined region of the environment, the controller 220 can cause the charger 101 to emit electromagnetic radiation and therefore charge the device 103. For example, if a person is initially present in the predefined region, the charger 101 is prevented from operating, and when the person moves out of the predefined region (e.g., to a safe distance from the charger 101), the charger 101 is (re-)activated.

In embodiments, the controller 220 is configured to further determine whether or not a moving object in the predefined region of the environment is of a predetermined object type. The preventing the charger 101 from emitting electromagnetic radiation is further based on determining that the object is of the predetermined object type. The predetermined object type may comprise an object to which electromagnetic radiation is potentially harmful and/or hazardous. Objects may be classified into object types based on their size and/or speed, for example. The predetermined object type may be an animate, or living, object, for example. In some cases, the predetermined object type is a human. Therefore, the controller 220 may be able to distinguish between different types of moving objects, and to selectively prevent emission of electromagnetic radiation based on such a distinction. For example, emission may be prevented if it is determined that the moving object is an animate object, whereas emission may be permitted if it is determined that the moving object is an inanimate object. This reduces the likelihood of charging being prevented unnecessarily.

In embodiments, the WPT system 100 comprises an activation mechanism (not shown) arranged to detect the presence of the device 103 adjacent to the charging pad 105. If the device 103 is detected, charging of the device 103 by the charger 101 may be performed, e.g., via the transmission coil 201. If the device 103 is not detected, activation of the charger 101 may be prevented. As such, in embodiments, activation of the charger 101 is permitted only when both a) the device 103 is present, and b) no foreign objects are detected in the predefined region of the environment. In some embodiments, the detection of foreign moving objects is performed only when the device 103 is present. In other embodiments, the foreign object detection is performed regardless of whether or not the device 103 is present.

Moving object detection may be performed either during charging or prior to charging commencing. If a moving object is detected in the predefined region during charging, then charging may be ceased. In such a scenario, the detection of moving objects by the motion sensor equipment 115 and/or controller 220 may be performed subsequently, e.g., at repeated time intervals. If, at a later time, no moving objects are detected in the predefined region of the environment, charging may be resumed. If a moving object is detected in the predefined region prior to charging, then the charging may be prevented from starting (e.g., activation of the charger 101 may be prevented). The charging may then be started at a later time, if, at the later time, no moving objects are detected in the predefined region.

Figure 3A:
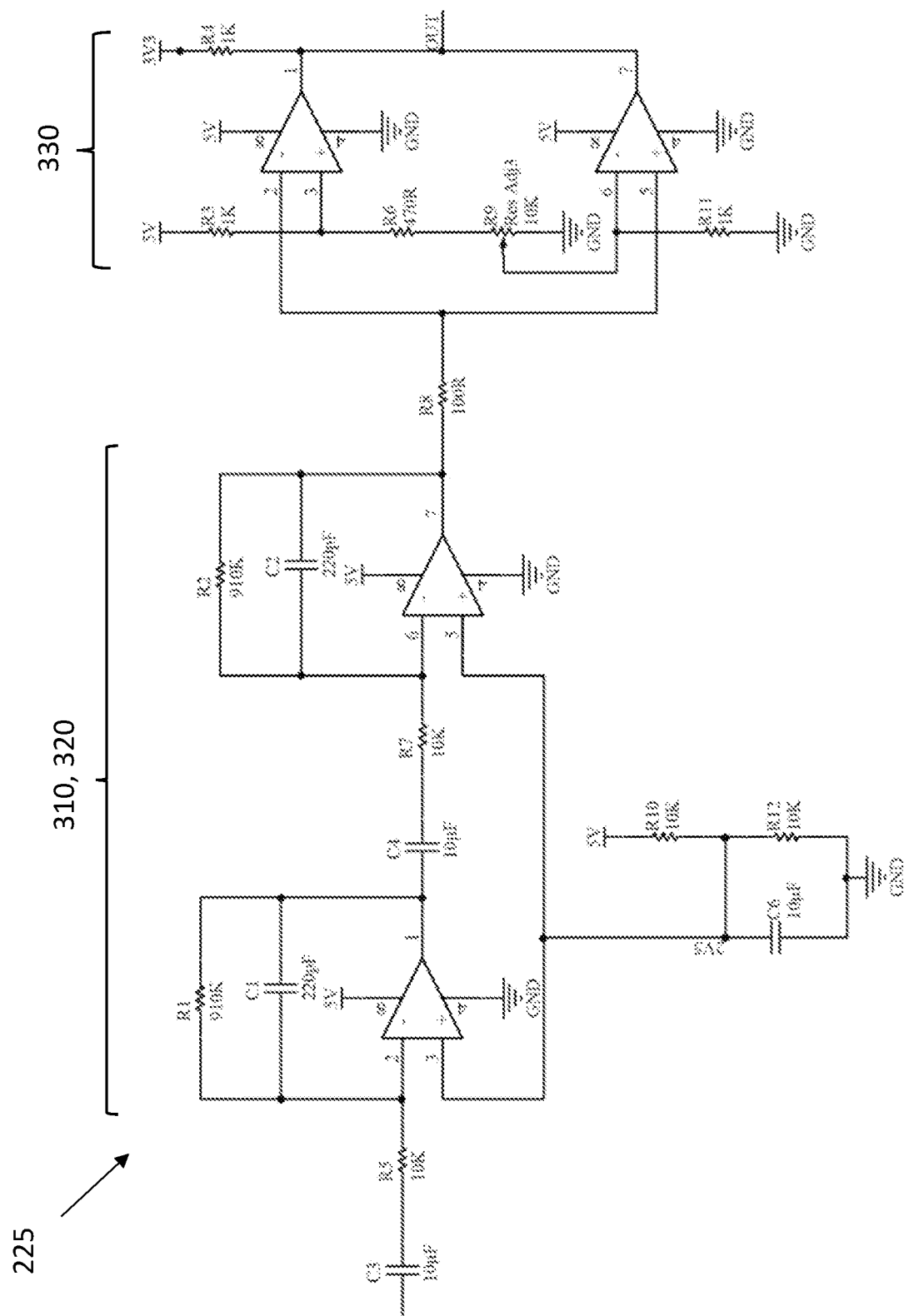
FIG. 3A shows a circuit diagram for conditioning circuitry according to embodiments of the present disclosure.
Figure 3B:
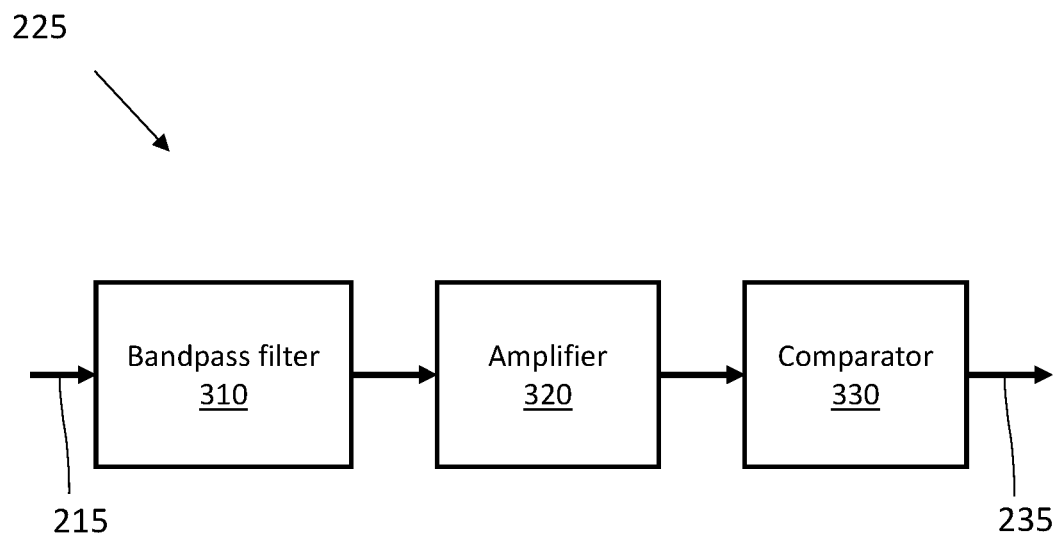
FIG. 3B shows a functional block diagram of conditioning circuitry according to embodiments of the present disclosure.

In embodiments, the controller 220 comprises conditioning circuitry 225. An example of the conditioning circuitry 225 is shown as a circuit diagram in FIG. 3A, and as a functional block diagram in FIG. 3B. It will be understood that the conditioning circuitry 225 may have more, fewer and/or different components in other embodiments. Further, the values of the electrical components shown in FIG. 3A are merely given as examples, and other values may be used in other embodiments.

The conditioning circuitry 225 is configured to receive the sensor output 215 from the motion sensor equipment 115 and to generate, based on the sensor output 215, a logic signal 235 indicating whether or not a moving object is present in the predefined region of the environment. The state of the logic signal 235 changes when moving objects in the predefined region are detected. Such a logic signal 235 may be used, for example as a control signal, to cause the emission of electromagnetic radiation by the charger 101 to be selectively prevented and/or permitted. The sensor output 215 comprises a constant signal in the absence of moving objects, and a varying signal in the presence of moving objects. The conditioning circuitry 225 is configured to detect the presence of an oscillating signal and therefore of a moving object.

In embodiments, the conditioning circuitry 225 comprises a bandpass filter 310. The bandpass filter 310 is configured to filter the sensor output received from the motion sensor equipment 115. The bandpass filter 310 has a bandwidth based on the speeds of moving objects to be detected. In the example shown in FIG. 3A, the bandpass filter 310 removes signals having a frequency less than 1.59 Hz or greater than 795 Hz. It will be appreciated that other frequency limits may be used in other examples. Low frequency signals are removed in embodiments such that non-moving objects do not influence the detection. High frequency signals are removed in embodiments such that the electromagnetic emissions from the charger 101 do not influence the object detection when the charger 101 is operating.

In embodiments, the conditioning circuitry 225 comprises an amplifier 320. The amplifier 320 is configured to generate amplified signals using a gain value. The gain value may be between 8000 and 9000, for example. An example gain value is 8281, it being understood that other gain values may be used in other examples. The conditioning circuitry 225 also comprises a comparator 330 configured to compare the amplified signals to a threshold. The gain value and/or the threshold are based on a size and/or distance from the charger 101 of moving objects to be detected. In embodiments, the gain value, threshold and/or the upper and lower frequencies of the bandpass filter 310 are determined empirically, e.g., during a testing phase.

In embodiments, the gain value and/or the threshold are determined so as not to detect objects that are further than a predefined distance from the motion sensor equipment 115. The gain value and/or the threshold may, in some embodiments, be determined so as not to detect objects that are nearer than a second predefined distance from the motion sensor equipment 115. In alternative embodiments, it is not determined whether objects are nearer than the second predefined distance from the motion sensor equipment 115. In embodiments, the gain value and/or threshold are determined so as to detect objects within a predefined size range. Such a size range may, for example, allow humans to be detected, whereas larger objects such as vehicles, which may not be adversely affected by the electromagnetic field of the charger 101, are not detected. As such, moving objects may be discriminated based on size. In embodiments, the gain value and/or threshold are determined so as to detect objects that are moving within a predetermined range of velocities. The size, distance and/or speed of moving objects in the environment may all influence the sensor output provided by the motion sensor equipment 115, and such differences may be determined and/or exploited by the controller 220. As such, the raw sensor output provided by the motion sensor equipment 115 is conditioned such that objects in a predefined region of the environment, and/or of a predetermined type, size and/or speed, are detected. This enables, for example, living objects that may be exposed to a potentially harmful electromagnetic field to be detected and, consequently, for emission of the electromagnetic field to cease, thereby protecting the living objects. In alternative embodiments, it is not determined whether objects are within a predefined size range. That is, moving objects are not discriminated based on size in such alternative embodiments. In some cases, for example, a small, fast-moving object at a given distance from the motion sensor equipment 115 will produce the same radar output as a large, slow-moving object at the same distance from the motion sensor equipment 115. Similarly, a large object moving at a given speed relatively far from the motion sensor equipment 115 may produce the same radar output as a small object moving at the same speed relatively near to the motion sensor equipment 115. In other cases, however, the two objects are distinguishable from one another based on distance, speed and/or size, e.g., through use of the conditioning circuitry 225.

Figure 4:
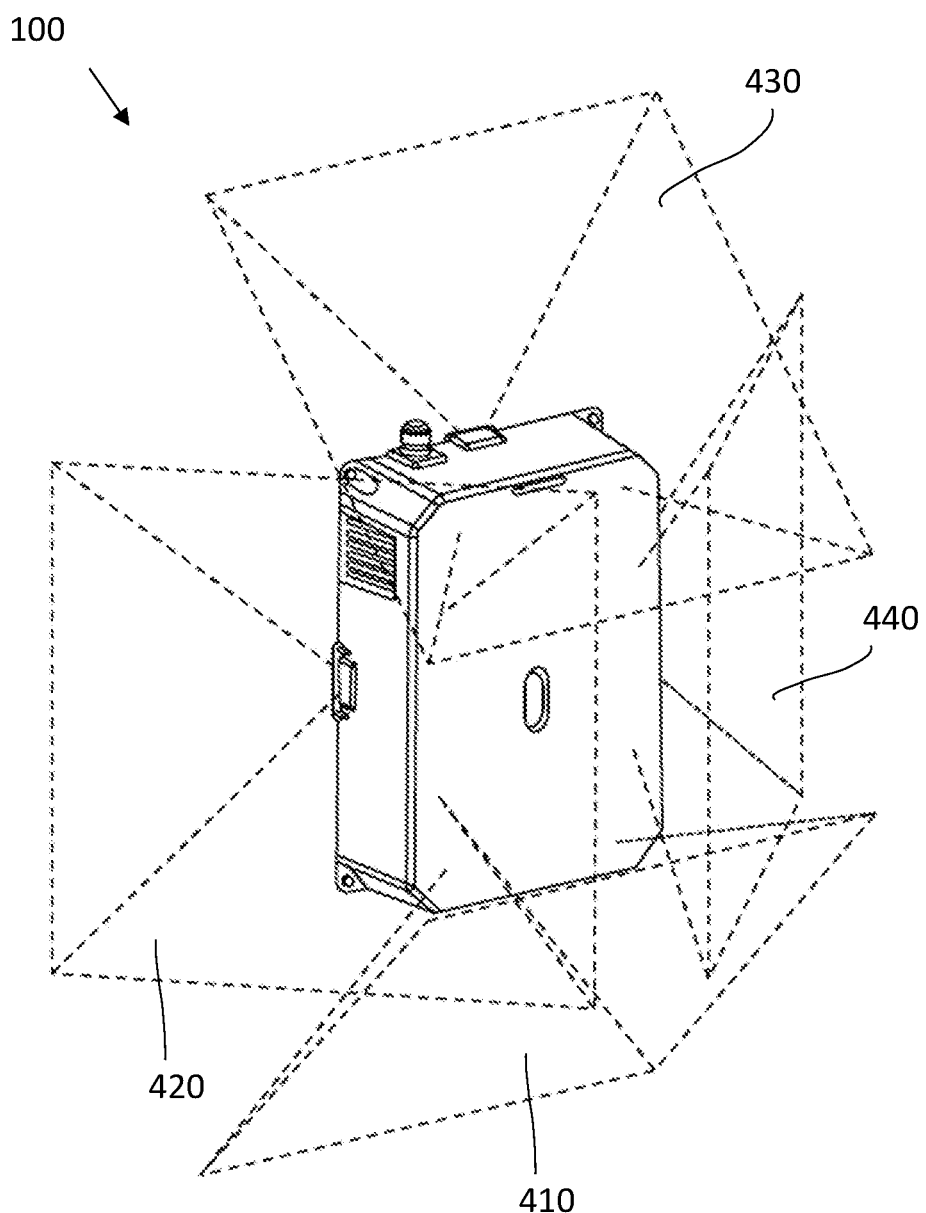
FIG. 4 shows a perspective view of a wireless power transfer system, according to embodiments of the present disclosure.

Referring to FIG. 4, there is shown a perspective view of the WPT system 100, according to embodiments of the present disclosure. FIG. 4 shows four detection zones 410, 420, 430 440 (depicted schematically with dashed lines) for each of four motion sensor devices 115. The detection zones covered by the motion sensor devices 115 depend on the opening angle of the motion sensor devices 115. Additionally or alternatively, the detection zones depend on the direction of propagation of RF signals transmitted and/or received by the motion sensor devices 115. At a given distance from the charger 101, at least some of the detection zones 410, 420, 430 440 intersect with one another. Therefore, in embodiments, the motion sensor devices 115 can detect moving objects in every direction around the charger 101.

Figure 5:
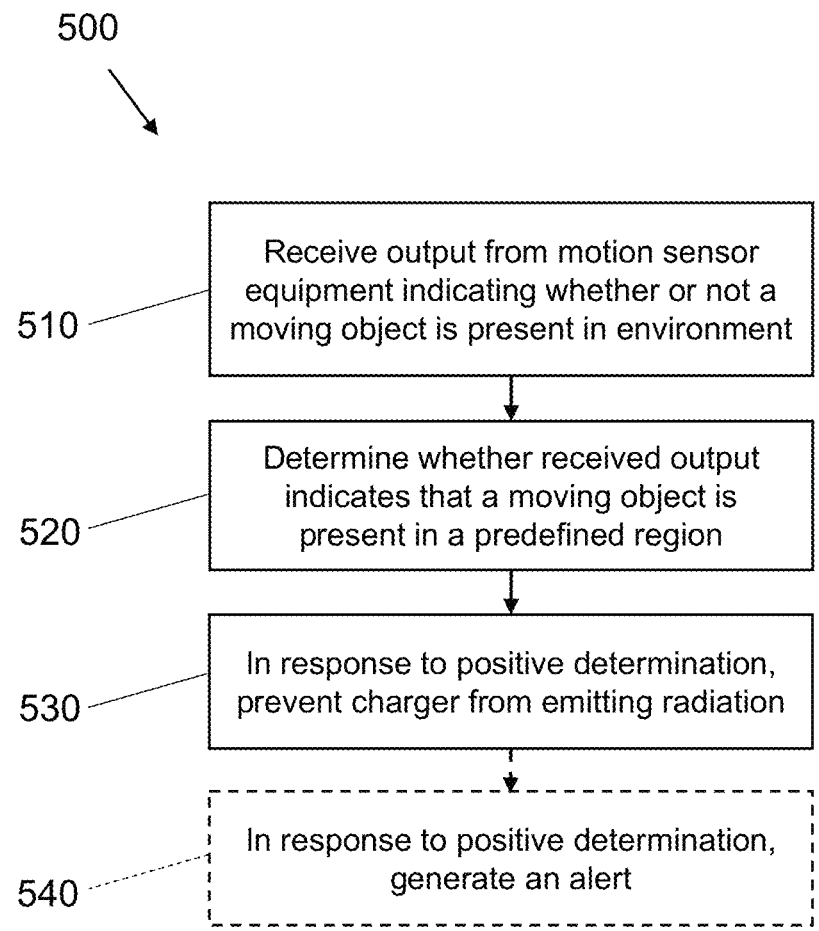
FIG. 5 shows a flow diagram depicting a method of controlling a wireless power transfer system, according to embodiments of the present disclosure.

Referring to FIG. 5, there is shown a method 500 of controlling a WPT system according to embodiments of the present disclosure. The WPT system comprises an electromagnetic induction charger operable to emit electromagnetic radiation into an environment of the charger. The method 500 may be used to control the WPT system 100 described above. In embodiments, the method 500 is performed by a controller such as the controller 220 described above. As such, the method 500 may comprise operations performed by hardware and/or software. In some cases, at least part of the method 500 comprises one or more computer processes performed in processing systems or processors. Examples described herein also extend to computer programs, for example computer programs on or in a carrier, adapted for putting the method into practice. The carrier may be any entity or device capable of carrying the program.

At step 510, an output is received from motion sensor equipment. The received output indicates whether or not a moving object is present in the environment.

At step 520, it is determined whether the received output indicates that a moving object is present in a predefined region of the environment.

At step 530, in response to a positive determination at step 520, the charger is prevented from emitting the electromagnetic radiation.

Optionally, at step 540, in response to a positive determination at step 520, an alert may be generated, such as the audio and/or visual alert generated by the controller as described above.

Whilst the present disclosure has been described and illustrated with reference to particular embodiments, it will be appreciated by those of ordinary skill in the art that the present disclosure lends itself to many different variations not specifically illustrated herein. By way of example only, certain possible variations will now be described.

In embodiments, the motion sensor equipment 115 comprises one or more radar devices. In alternative embodiments, the motion sensor equipment 115 comprises other types of sensor device. For example, the motion sensor equipment 115 may comprise an optical sensor, such as an image sensor, an active or passive infrared sensor, and/or an ultrasonic sensor. In some embodiments, the motion sensor equipment 115 comprises a radar device other than a Doppler radar device.

In embodiments, an angle between the direction of propagation of a radar device and the plane of the transmission coil is less than 90 degrees and greater than −90 degrees. In alternative embodiments, the angle is 90 degrees or −90 degrees. That is, the radar device may emit RF signals in a direction perpendicular to the plane of the transmission coil and/or perpendicular to the plane of the charging pad.

In embodiments, the controller comprises conditioning circuitry configured to receive sensor output from the motion sensor equipment and to generate, based on the sensor output, a logic signal indicating whether or not a moving object is present in the predefined region. In alternative embodiments, the sensor output from the motion sensor equipment comprises such a logic signal. In such embodiments, the conditioning circuitry may, for example, be comprised in the motion sensor equipment.

In embodiments, a moving object detection system is integrated in and/or coupled to the charger 101. That is, the moving object detection system is part of the primary side of the WPT system 100. In alternative embodiments, a moving object detection system is integrated in and/or coupled to the device 103. That is, the moving object detection system may be part of the secondary side of the WPT system 100.

In some embodiments, the WPT system is for use in charging a battery-powered forklift truck. In alternative embodiments, the WPT system is for use in charging different types of battery-powered vehicles. For example, the WPT system may be used in electrically powered cars, buses, scooters, aircraft, marine vehicles, etc. The WPT system may be used for charging electrically-chargeable items and/or objects other than vehicles in alternative embodiments.

Where in the foregoing description, integers or elements are mentioned which have known, obvious or foreseeable equivalents, then such equivalents are herein incorporated as if individually set forth. It will also be appreciated that integers or features of the present disclosure that are described as preferable, advantageous, convenient or the like are optional and do not limit the scope of the independent claims. Moreover, it is to be understood that such optional integers or features, whilst of possible benefit in some embodiments, may not be desirable, and may therefore be absent, in other embodiments.

The features of any dependent claim may be combined with the features of any of the independent claims or other dependent claims. Features described in relation to one example or embodiment may be used in other described examples or embodiments, e.g., by applying relevant portions of that disclosure.

What is claimed is:

1. A wireless power transfer (WPT) system, comprising:
   an electromagnetic induction charger operable to emit electromagnetic radiation into an environment of the charger;
   motion sensor equipment operable to generate an output indicating whether or not a moving object is present in the environment; and
   a controller configured to:
      receive the output from the motion sensor equipment;
      determine whether the received output indicates that a moving object is present in a predefined region of the environment; and
      in response to a positive determination, prevent the charger from emitting the electromagnetic radiation,
   wherein the predefined region extends in a given direction from the charger to an outer boundary that is set at a predefined distance from the charger, and
   wherein the controller is configured to modify the predefined distance to thereby modify the predefined region based on an intensity of the electromagnetic radiation emitted by the charger and/or based on a power output of the charger.

2. The system of claim 1, wherein the motion sensor equipment comprises a plurality of radar devices, wherein different radar devices in the plurality of radar devices are configured to emit RF signals in different directions and/or receive RF signals from different directions.

3. The system of claim 1, comprising a housing arranged to house the charger, wherein the motion sensor equipment is housed substantially within the housing.

4. The system of claim 1, wherein the controller is configured to cause the charger to emit electromagnetic radiation in response to a negative determination, subsequent to the positive determination.

5. The system of claim 1, wherein the controller is configured to:
   further determine whether or not a moving object in the predefined region is of a predetermined object type; and
   wherein the preventing is further based on determining that the object is of the predetermined object type.

6. The system of claim 1, wherein the controller is configured to generate an alert in response to determining that a moving object is present in the predefined region of the environment.

7. The system of claim 1, wherein the motion sensor equipment comprises a radar device.

8. The system of claim 7, wherein the radar device comprises a Doppler radar device.

9. The system of claim 7,
   wherein the charger comprises a transmission coil occupying a plane,
   wherein the radar device is arranged to emit radio frequency (RF) signals having a direction of propagation, and
   wherein an angle between the direction of propagation and the plane of the transmission coil has a magnitude of less than 90 degrees.

10. The system of claim 1, wherein the controller comprises conditioning circuitry configured to receive the sensor output from the motion sensor equipment and to generate, based on the sensor output, a logic signal indicating whether or not a moving object is present in the predefined region.

11. The system of claim 10,
   wherein the conditioning circuitry comprises a bandpass filter configured to filter the sensor output received from the motion sensor equipment, and
   wherein the bandpass filter has a bandwidth based on speeds of moving objects to be detected.

12. The system of claim 10, wherein the conditioning circuitry comprises:
   an amplifier configured to generate amplified signals using a gain value; and
   a comparator configured to compare the amplified signals to a threshold,
   wherein the gain value and/or the threshold are based on a size and/or distance from the charger of moving objects to be detected.

13. A method of controlling a wireless power transfer (WPT) system, the WPT system comprising an electromagnetic induction charger operable to emit electromagnetic radiation into an environment of the charger, the method comprising:
   receiving, from motion sensor equipment, an output indicating whether or not a moving object is present in the environment;
   determining whether the received output indicates that a moving object is present in a predefined region of the environment; and in response to a positive determination, preventing the charger from emitting the electromagnetic radiation, wherein the predefined region extends in a given direction from the charger to an outer boundary that is set at a predefined distance from the charger, and wherein the method comprises modifying the predefined distance to thereby modify the predefined region based on an intensity of the electromagnetic radiation emitted by the charger and/or based on a power output of the charger.

14. The method of claim 13, wherein the motion sensor equipment comprises a plurality of radar devices, wherein different radar devices in the plurality of radar devices are configured to emit RF signals in different directions and/or receive RF signals from different directions.

15. The method of claim 13, wherein the WPT system comprises a housing arranged to house the charger, wherein the motion sensor equipment is housed substantially within the housing.

16. The method of claim 13, wherein the method comprises causing the charger to emit electromagnetic radiation in response to a negative determination, subsequent to the positive determination.

17. The method of claim 13, wherein the method comprises:

further determining whether or not a moving object in the predefined region is of a predetermined object type; and wherein the preventing is further based on determining that the object is of the predetermined object type.

18. The method of claim 13, wherein the motion sensor equipment comprises a radar device.

19. The method of claim 18, wherein the radar device comprises a Doppler radar device.

20. The method of claim 18, wherein the charger comprises a transmission coil occupying a plane, wherein the radar device is arranged to emit radio frequency (RF) signals having a direction of propagation, and wherein an angle between the direction of propagation and the plane of the transmission coil has a magnitude of less than 90 degrees.

* * * * *